Patented Jan. 7, 1947

2,413,855

UNITED STATES PATENT OFFICE 2,413,855

EMULSION

Ernst Berl, Pittsburgh, Pa.; Walter G. Berl executor of said Ernst Berl, deceased No Drawing. Application June 13, 1941, Serial No. 397,927. In Great Britain July 7, 1933

3 Claims. (Cl. 252—33.4)

The present invention relates to wetting and emulsifying agents and to the use thereof. It is a continuation in part of my copending application No. 219,485, filed July 15, 1938, which in turn is a continuation in part of my application No. 729,446, filed June, 1934.

It is an object of the present invention to provide an improved wetting and emulsifying agent which is practical and economical and which can be manufactured more cheaply than heretofore known.

A further object of the invention is to provide a process for the treatment of water-soluble sulfonic acid tar obtained from the distillation of petroleum and tar whereby improved wetting and emulsifying agents may be produced.

The invention also contemplates the provision of wetting and emulsifying agents having excellent properties for use in emulsions for fire extinguishing, dust collecting, drilling, wetting raw cotton, or street or road coating material, fireproofing, and insecticides.

Other objects and advantages of the invention will become apparent from the following description:

I have discovered that in the manufacture of certain purified petroleum and tar distillation products, so-called water-soluble acid tars obtained are excellent wetting and emulsifying agents with surprising and hitherto unknown properties. The tar probably contains among other constituents sulpho compounds of an aliphatic, naphthenic and aromatic nature as well as an excess of uncombined sulphuric acid. It is to be noted that water-soluble acid tar differs from ordinary water-insoluble acid tar which possesses little importance and is useless for the purpose of the present invention.

The water-soluble sulfonic acid tar, with which my invention is concerned, has the general formula X—$SO_3H$, wherein X stands for an organic radical (aliphatic, hydroaromatic or aromatic) with a small or medium number of carbon atoms. The $SO_3H$ radical conveys the water-soluble property to the acid tar; however, its water solubility decreases with an increase in the number of carbon atoms present in the organic radical X. Thus, an acid tar, wherein X, for example, $=C_8H_{17}$, will be water-soluble (hydrophil), while an acid tar, wherein X, for example, $=C_{40}H_{81}$, will be water-insoluble (hydrophob). Thus only those acid tars in which the influence of the hydrophil radical $SO_3H$ predominates over the influence of the hydrophob organic radical X are within the scope of my invention.

Similarly, the salts of water-soluble sulfonic acid tars within the scope of my invention have the general formula X—$SO_3$—Y, wherein X stands for the organic radical with a small or medium number of carbon atoms; Y stands for sodium, potassium, ammonium, earth alkali, etc. X is the hydrophobic radical, and its hydrophob effect increases with an increase in the number of carbon atoms; while $SO_3$—Y is the hydrophilic radical. Consequently, as in the case of the acid tar, only those salts in which the influence of the hydrophilic group $SO_3$—H predominates over the influence of the hydrophobic group X (thanks to the absence of an excessive number of carbon atoms in the latter), come within the scope of my invention.

The acids and salts within the scope of my invention form true watery solutions. The free acids are more or less soluble in certain organic solvents; the alkali salts are insoluble in non-polar organic solvents, but may be partly soluble in polar solvents like alcohols and acids.

Generally speaking, I have found that aqueous solutions of water-soluble acid tar or soluble salts thereof substantially devoid of free sulphuric acid, considerably lower the surface tension of water. In Traube's stalagomometer, water gives 53 drops while about a 1% solution of the sodium salt of acid tar gives 95 drops and about a 2% solution gives more than about 100 drops. In addition to this extremely valuable and surprising physical property, the neutral or approximately neutral salt solutions exhibit a pronounced capacity for foam formation. The known wetting agents of commerce, for example, NEKAL preparations (sodium salts of isopropyl naphthalinic-sulfonic acid) as well as saponin solutions lack this property. Due to the accentuated foam formation property of the present wetting and emulsifying agents, the latter are excellent for fire extinguishing purposes, provided that care is taken that the bubbles of foam are filled wholly or in part with non-inflammable gas, for example carbon dioxide.

The application of the acids or soluble alkali salts, alkaline earth salts and heavy metal salts and of mixtures of such acids and salts obtainable in accordance with the invention is extremely wide.

The solutions of the alkali salts of water-soluble acid tar readily wet substances which can only be rendered wet with difficulty, such as for example, dust of all kinds, such as blast furnace gas dust, brown coal dust, flue dust and the like. To effect their precipitation and also for extinguishing fires, for example, bituminous coal fires or brown coal fires, or for smothering flowing coke and for many other purposes, weak or stronger solutions (¼ to 10%) can be employed with good success and satisfactory results.

The above indicated wetting power renders possible the applicability of the salt solutions of the tar acids for cutting oil for metals purposes, in which case petroleum for facilitating the sliding action and/or substances possessing a weakly alkaline action such as di- or tri-sodium phosphate, can be added.

A great advantage is obtained when employing the substances, obtainable in accordance with the present invention, in the bleaching industry. For example, when wetting raw cotton by dipping into a ½ to 1% solution of an alkali salt of acid tar, and subsequently boiling with alkali and bleaching, an improved bleaching effect is thus obtained in a shorter time at a lower boiling temperature and with less expenditure of steam.

The free acids have a great solvent power for various classes of substances, for example, bitumens. After neutralization the solutions give extremely stable emulsions, which can find application, for example, as street covering.

The ammonium salts of the tar acids, which likewise exhibit an excellent wetting action, can be employed with advantages as fireproofing agents. They decompose at high temperatures with liberation of ammonia and sulphur-oxygen compounds, which render difficult or prevent access of oxygen to the burning materials.

The salts of the tar acids are readily available for the manufacture of stable emulsions of solvents of all kinds, for example, benzene, chloro benzene, carbon tetrachloride, trichloroethylene and the like. For example, by shaking a 1% solution of the sodium salt with benzene, this is thus completely emulsified particularly when intensive agitation is used. By employing suitable proportions, the total quantity of benzene added can be converted to a viscous completely stable emulsion containing about 80% benzene. This emulsion possesses an excellent solvent power for fats, oils, dirt and the like. In a similar manner emulsions of other substances such as trichloroethylene, carbon tetrachloride and the like, or emulsion mixtures of such like solvents can be obtained. By the addition of appropriate quantities of soap or other substances these solutions can be thickened. Moreover, inorganic substances such as, for example, magnesium carbonate and the like can be added thereto and when employed for cleaning, these substances exert a scouring action.

The excellent capacity of the above indicated materials can also be made use of for the production of insecticides for the extermination of vermin, mosquitoes, gnats and the like. For example, by incorporating within a mixture, as above described, consisting of trichloroethylene, benzene and petroleum emulsion, poisonous substances, such as for example para dichlorobenzene, chlorophenols or petrol extracts from appropriate plants which destroy vermin, a very efficacious destructive action of insects of all kinds can be attained. The effect is increased by the addition of pyrethrum. Thus, quite small additions of a solution of para dichlorobenzene in a trichloroethylene emulsion suffice to kill off the larvae of insects of all kinds within a short period by paralyzing the center of respiration. The new emulsions are equally suitable for the production of emulsions for spraying.

It is to be observed that all kinds of phenols can be emulsified very easily by using alkali salts of the tar acids. These emulsified phenols can be used for various purposes; for instance, for sterilization, for emulsifying all material like hydrocarbons and other more or less hydrophobe substances. Such emulsified phenols can be used with excellent results for extractions of all kinds. Ketones, ethers, acids and saturated aromatic substances can be extracted very easily; also saturated and polar substances.

These phenol emulsions can be used with great success for the treatment of wood to make it resistant against the action of bacteria and other wood-destroying small organisms.

It is also to be noted that such emulsions can be used to great advantage in the introduction of water combined with liquid fuels in combustion engines of all kinds. In this way one can cool the ignition flame with the water and get a very cheap anti-knock effect.

Furthermore, aniline and homologues are emulsified very easily with alkali salts of these tar acids. Such emulsions can be employed with great advantage also for chemical reactions and extraction purposes.

The manufacture of wetting and emulsifying agents obtainable in accordance with the invention can be accomplished in various ways from the dark-colored water-soluble acid tar, which, as a rule, still contains dissolved sulfurous acid.

One method of manufacturing consists in separating the uncombined sulfuric acid, present in excess, from the high molecular organic compounds by osmosis. When water-soluble acid tar is dialysed against water by means of a semipermeable membrane, for instance parchment paper, nitrocellulose paper and the like, a migration of the sulfuric acid into the water takes place, and a mixture of free higher molecular acids of an aliphatic, naphthenic and aromatic nature remains behind, which can find application either as such or in the form of alkali salts, alkaline earth salts or heavy metal salts thereof (for example, copper salts, mercury salts, silver salts, and the like). In certain desired cases the free acids can be combined with the material to be emulsified and the emulsifying process can be accomplished or completed by subsequent neutralization.

A second method of obtaining the free tar acids completely or approximately void of sulfuric acid, consists in shaking the water-soluble acid tar, with advantage previously diluted by water, with a suitable solvent, for example ether. After separating the solvent layer from the aqueous layer, the solvent is evaporated, and the free tar acids remain.

A third method consists in treating the water-soluble acid tar with saturated solutions of sulfates, for example, sodium sulfate, or even with solutions containing an excess of salt. The free sulfuric acid thus enters the aqueous salt phase as bisulfate, which in turn operates to salt out the free tar acids.

Furthermore, the free acids can be produced by treating the alkali salts, alkaline earth salts, and/or the heavy metal salts with acids exerting a stronger acidity.

For the purpose of obtaining salts from the free acids of the acid tar, the latter after isolation can be treated with suitable bases, for example hydroxides, carbonates or salts of weaker acids. It is not absolutely essential to isolate the free acids from the mixture thereof with sulfuric acid; the crude acid tar may be dissolved in water, heated to remove the dissolved sulfurous acid, and then the desired neutralization of the acids can be accomplished by means of the corresponding salts, for example chlorides. By adding, for example, sodium chloride, potassium chloride or ammonium chloride in solid form or in concentrated solution, the alkali salts of the tar acids are formed in addition to the hydrochloric acid, when the former are salted out by the sulfates or bisulfates then present. After adding the chloride, the mixture is concentrated or distilled whereby the free HCl is volatilized. From the aqueous solution the inorganic salts can be obtained in the known manner. The salted out mixture of inorganic substances still containing free mineral acid can be converted almost completely into the salt form by repetition of the process described. With advantage the last portions of acid are removed by neutralization with basic salts, for example carbonates and hydroxides, whereby a change of color from black to brown takes place. The salts of the acid tar acids then precipitate in the form of a thinly liquid substance, while hot, which becomes viscous when cool, which is practically completely soluble in water and which after salting out contains about 70% to 80% of dry substance. If desired or required, this viscous mass can be taken completely to dryness in a suitable apparatus, for example by surface evaporation; it is then obtained in the form of a yellowish-brown powder which is soluble in water.

I claim:

1. A metal cutting emulsion comprising a watery solution of a dispersing agent, said dispersing agent comprising a salt of a water-soluble sulfonic tar acid and petroleum and alkaline-reacting alkali phosphate salt.

2. A metal cutting emulsion according to claim 1 in which the alkaline phosphate alkali salt is disodium phosphate.

3. A metal cutting emulsion according to claim 1 in which the alkaline phosphate alkali salt is trisodium phosphate.

ERNST BERL.